United States Patent [19]

van Haaften

[11] 4,085,769

[45] Apr. 25, 1978

[54] FLUID DISTRIBUTION SYSTEM

[76] Inventor: Lourens Theodor van Haaften, Plantsoen Laanhorn 18, Amstelveen, Netherlands

[21] Appl. No.: 664,484

[22] Filed: Mar. 8, 1976

[30] Foreign Application Priority Data

Mar. 17, 1975 Netherlands ................... 7503122
Apr. 1, 1975 Netherlands ................... 7503836

[51] Int. Cl.² ................................. A01G 27/00
[52] U.S. Cl. ........................... 137/119; 137/268; 137/624.18; 137/112; 239/66; 239/67; 239/70
[58] Field of Search ............. 137/119, 268, 624.18, 137/112, 113; 251/154; 239/66, 67, 70

[56] References Cited

U.S. PATENT DOCUMENTS

| 2,921,629 | 1/1960 | Stout | 137/119 |
|---|---|---|---|
| 3,144,038 | 8/1964 | Stilwell | 137/119 |
| 3,512,543 | 5/1970 | Kubik | 137/119 |
| 3,780,756 | 12/1973 | Pennington | 137/119 |
| 3,797,740 | 3/1974 | Kah, Jr. | 239/66 X |
| 3,845,777 | 11/1974 | Gilson | 137/119 |

Primary Examiner—William R. Cline
Attorney, Agent, or Firm—Brumbaugh, Graves, Donohue & Raymond

[57] ABSTRACT

A system for distributing a piped fluid uses a plurality of valves arranged along a fluid conduit. The valves are successively opened for a selected period of time by a plug element inserted in the conduit and carried by the fluid. The plug element engages the valves and opens each valve in response to fluid pressure. In a preferred embodiment, the plug element upon completion of a circuit through the conduit automatically reverses the direction of fluid flow. There is also disclosed a sprinkler head for use in connection with the distribution system.

19 Claims, 7 Drawing Figures

FLUID DISTRIBUTION SYSTEM

BACKGROUND OF THE INVENTION

This invention relates to systems for distributing a piped fluid, such as a liquid or gas. In particular this invention relates to systems for supplying a piped fluid successively to a number of outlets.

Large scale sprinkling or irrigation systems often require distribution of water to a large number of outlets. In order to avoid an excessive drop in water pressure, outlet openings in the distribution systems must be turned on individually. When the system is spread out over a large area, such as a farm to be irrigated, it is inconvenient to manually activate valves which are spread out over the area to be irrigated. Prior devices for remote control of such valves have made use of electricity or pressurized air to selectively open and close remote valves. Such systems are costly to install and require the presence and use of energy sources in addition to the pressure of the piped fluid.

In addition to irrigation systems, it is useful to have remote control of piped fluids in such systems as central machinery lubrication, refrigeration, heating, air conditioning, and chemical industrial processes.

It is an object of the present invention to provide a system for distributing piped fluid to a large number of outlets without excessive fluid pressure loss.

It is a further object of the present invention to provide such a system which makes use of the piped fluid for the activation of remote valves.

It is a still further object of the invention to provide such a system which is inexpensive to construct and operate.

SUMMARY OF THE INVENTION

In accordance with the present invention there is provided a system for distributing a piped fluid which includes a plurality of valves arranged along a conduit between a supply header and a vent. There is provided a plug element in the conduit, which moves in response to the pressure difference between the supply pressure and the vent pressure. As it moves through the distribution pipe the plug element engages each valve for a selected period, opening the valve and allowing fluid to flow through the valve outlet, and then advances to the next valve.

In a preferred embodiment the distribution system forms a substantially complete loop beginning and ending with the fluid supply main. A special control device is provided which connects the ends of the distribution loops to the water supply main and reverses the direction of fluid flow after the plug element has traveled from one end of the conduit to the other.

In a further embodiment of the invention, the period during which the plug element keeps a distribution valve in the open position is controlled by means affixed to and enclosed within the plug element.

For the purposes of this embodiment, the distribution valves and plug element are designed to cooperate with each other as follows:

The distribution valve has a valve body through which fluid normally flows (when the valve is closed) in alignment with the piping system through which the fluid is distributed. An appropriate side opening in the valve, controlled by a valve closing means, permits distribution of fluid out of the valve. Within the valve body, and aligned with the normal direction of flow is a tubular sleeve which controls the opening and closing of the valve closing means.

Cooperating with the foregoing valve is a plug element which comprises a generally cylindrical body capable of passing through the piping system, valve body and sleeve just described. The plug is provided with engaging means such as fins, wings, ribs, legs, balls and the like which protrude therefrom and in the protruding position engage the sleeve and cause the valve to open. The engaging means are supported in position to engage the sleeve by a first elastic liquid-filled chamber within the plug. This first chamber is connected to a second elastic chamber, as will be further described momentarily by means of a check valve orientated to allow liquid to flow freely only from the second chamber to the first chamber.

When the engaging means on the plug element engages the sleeve of the valve, fluid pressure tending to force the plug element through the sleeve causes the engaging means to compress the first chamber, and thus tends to force liquid therefrom.

The first elastic chamber is also provided with a small leak which may be either an imperfection of the sealing of the check valve, or a separate narrow passage, such that the liquid within the first chamber will slowly leak, in response to this force of the engaging means, into the second elastic chamber. As the liquid slowly leaks from the first elastic chamber, the first chamber relaxes, thereby permitting the engaging means to release from the sleeve within the valve body and permitting the plug element to pass through the sleeve and out of the valve. Having left the sleeve, the pressure against the first chamber is released, and liquid which had been forced out of the first chamber flows back into it through the check valve. The plug element is carried with the fluid flow along the conduit to the next distribution valve, where the same procedure is repeated.

When the plug element is engaged with the sleeve, it exerts a force on the sleeve as a result of the fluid pressure in the conduit and causes the sleeve to move sufficiently to uncover an outlet port in the distribution valve housing.

To receive the plug element into the sleeve easily, the sleeve may have frusto-conical shaped entrances. The diameter of the passage through the sleeve is one or several millimeters smaller than the inside diameter of the conduit. Consequently the plug element can move freely through the conduit.

As indicated above in an important embodiment of this invention, the fluid distribution system forms essentially a loop having its terminal ends joined by a special control device to the fluid supply header. The special control device is designed to reverse the direction of movement of the plug element after it has reached one terminal end of the conduit.

This flow control device comprises two flow control valves and two vent control valves which are interconnected. If for example the fluid and plug element are to be delivered initially in a clockwise direction through the loop, the appropriate (first) flow control valve and (second) vent control valve are opened. After the plug element has moved completely through the distribution loop it engages the second control valve. The force of this engagement causes the second control valve to open, and at the same time the interconnections between the control valves and vent valves cause the first control valve and second vent valve to close and the first vent valve to open. The direction of fluid flow is thus reversed and the plug element will now return through the distribution loop in the counterclockwise direction. Upon reaching the flow control device the reversal process is repeated.

The invention also relates to a sprinkler which can be used with the device described above. A known sprinkler used for irrigation purposes consists of an upright stand pipe, a sprinkler head connected with the stand pipe, a nozzle fitted into the sprinkler head at an inclined angle to its center line, and means to rotate the sprinkler head in relation to the stand pipe.

With this known sprinkler water is dispersed from the nozzle fitted into a slowly rotating sprinkler head over a surrounding area. The energy for the rotation of the sprinkler head is derived from the dynamic pressure of the water leaving the nozzle, by transforming the pressure into a rotational motion by a comparatively complex mechanism. Consequently, these sprinklers are expensive, require regular maintenance, and are subject to a considerable amount of wear and tear.

Since the distribution system in accordance with the present invention provides for intermittent and repeated opening of each of a succession of distribution valves, there may be provided a sprinkler head which angularly advances a predetermined amount each time the corresponding distribution valve is opened.

A sprinkler can therefore be provided which is capable of the same performance as the rotating sprinklers generally used, but is far cheaper to manufacture and requires less maintenance.

According to an embodiment of the invention, the sprinkler head is axially slidable in the stand pipe between two end positions, taking up the first high position when water under pressure is supplied to it and the second low position when the water supply is cut off. During this reciprocating motion the co-operating means for the rotation of the sprinkler head will cause it to advance from one angular indexing position to the next. When the sprinkler head is in use it remains stationary and disperses water only over a sector of the total circular area to be irrigated by it. When the water supply is cut off and resumed again the sprinkler head will be rotated by its axial movement and it will disperse water over the next adjacent sector of the circular area.

In a particularly simple embodiment of the invention, sealing means between supply pipe and sprinkler head are provided by means of an O-ring which can be pressed between the facing surfaces of a collar on the inside of the supply pipe and a flange at the lower end of the sprinkler head. During sprinkling periods, a radial surface of the flange of the then stationary sprinkler head presses the O-ring against a radial surface of the collar in the supply pipe, but during off-periods and during angular movement of the sprinkler head the sealing surfaces are spaced apart, so that wear and tear are reduced to a minimum.

In a preferred embodiment, means for the rotation of the sprinkler head consists of two axially spaced apart crowns of teeth around the lower part of the periphery of the sprinkler head, the teeth of which are facing each other in a staggered position and are co-operating with at least one pin secured on the inside wall of the stand pipe. This pin projects into the recess between the two crowns and bears against the sloping flank of a tooth of one of the crowns when the sprinkler head moves axially from its first end position to the second and against the sloping flank of a tooth of the other crown when moving from its second position to its first one, thereby causing it to rotationally advance from one angular position to the next.

In another embodiment, the toothed crowns are part of a raised flange around the periphery of the sprinkler head, their teeth pointing in opposite axial directions and co-operating with pins secured on the inner wall of the stand pipe on either side of the raised cam.

For a better understanding of the present invention together with other and further objects thereof reference is had to the following description, taken in conjunction with the accompanying drawings and its scope will be pointed out in the appended claims.

DESCRIPTION OF THE INVENTION

Figure 1:
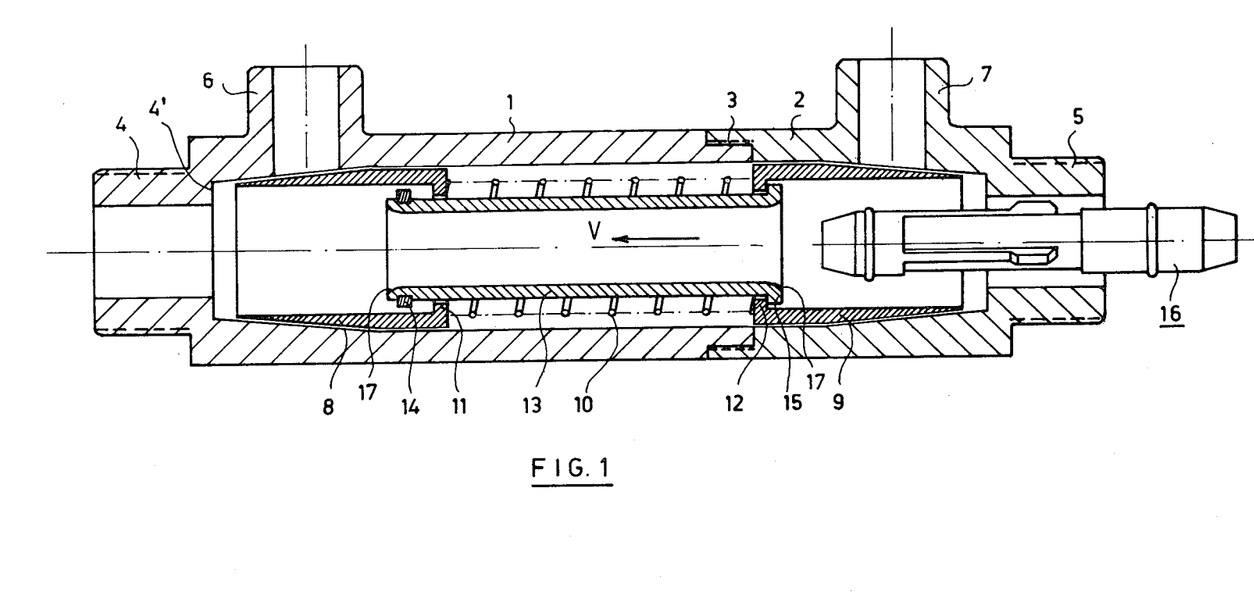
FIG. 1 shows a distribution valve in accordance with the present invention.

The distribution valve illustrated in FIG. 1 comprises a valve housing consisting of two T-pieces 1 and 2, tightly joined together for instance by means of screw thread 3. The axially aligned through-ports 4 and 5 are connected to a main conduit and the lateral outlet ports 6 and 7 to sprinklers or other distribution devices, or to lateral lines provided with such devices.

In their position of rest frusto-conically shaped valve members 8 and 9 are pressed into their seats in the T-pieces 1 and 2, respectively, by a spring 10, keeping outlet ports 6 and 7, respectively, closed. For clarity the valve members are drawn at a small distance away from their seats. The interior of each of valve members 8 and 9 is hollow and is cylindrically shaped for the greater part of its length, but the facing ends of the members are provided with inwardly directed collars 11 and 12, respectively, which co-operate with a tubular sleeve 13 by means of a locking ring 14 and a flange 15, respectively. Tubular sleeve 13, henceforth referred to as "the plug receiver", has frusto-conical shaped entrances 17 to facilitate the receiving of a plug element 16, which will be described in detail below.

With valve members 8 and 9 in their position of rest the fluid can pass freely through these valves and plug receiver 13, but when a plug element 16 is present in the pipeline this will be carried along by a flow, directed in FIG. 1 to the left as indicated by arrow V, and will arrive in plug receiver 13, intercepting the flow of the medium through it. Forced by the pressure of the fluid on plug element 16, plug receiver 13 now moves to the left in the direction of arrow V, pulling valve 9 with it, and thereby opening outlet port 7.

In its extreme left position the left front side of plug receiver 13 will engage the radial surface of shoulder 4' near through-port 4, thereby preventing the escape of fluid from the distribution valve housing along the outside periphery of valve member 9 or the engaging faces of collar 12 and flange 15. The sealing between the front side of plug receiver 13 and the radial surface of shoulder 4' can be sufficiently tight if suitable materials are used. It is possible, however, to provide the shoulder 4' with a sealing ring.

As will be explained afterwards in connection with FIG. 2, plug element 16 is temporarily retained in plug receiver 13. After a given period plug element 16 leaves plug receiver 13, with the result that valve 9 under the influence of spring 10 returns to its initial position, taking plug receiver 13 along with it. The various parts of the distribution valve then take up the positions again as shown in FIG. 1.

Obviously, if the medium flows in the opposite direction and plug element 16 enters the distribution valve via through-port 4, valve member 8 will be displaced to the right as seen in FIG. 1 and fluid will leave distribution valve through outlet port 6.

Figure 2:
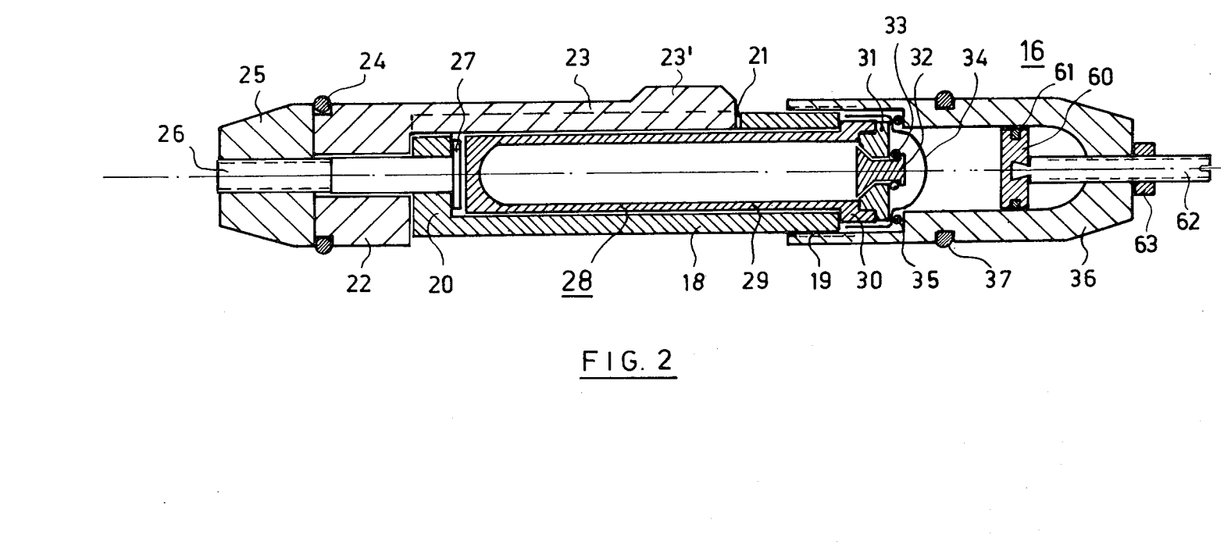
FIG. 2 is a cross-section diagram of a plug element in accordance with the present invention.

FIG. 2 shows an enlarged cross section view of plug element 16. The plug element comprises a cylindrical jacket 18, provided with outer screw thread 19 at one end and closed by bottom 20 at the other end. Jacket 18 is further provided with several slots 21, extending over a given length of the jacket and continuing in the bottom 20.

A disc shaped element 22 provided with as many legs 23 as there are slots 21 is fitted against bottom 20 in such manner that each slot 21 accommodates one leg 23. The front side of disc 22 has a step to take up O-ring 24, which is locked into place be a frusto-conical nut 25, screwed on to a bolt 26, the head 27 of which lies on the inside of bottom 20 and the shaft of which passes through holes in bottom 20 and disc 22.

Jacket 18 encases a first fluid-filled chamber 28, consisting mainly of a liquid filled elastic tubular bag 29, closed at one end and provided with a collar 30 at the other end. A cover 31 is fitted into collar 30 and is provided with a seat for check valve 32. The valve 32 is pressed against its seat in the one side of cover 31 by means of elastic washer 33, lying against the other side of cover 31. The space at this side of cover 31 is enclosed by a membrane 34, which via an O-ring 35 is pressed against cover 31 by plug head 36, the latter being tightly screwed onto thread 19. The plug head 36 is provided with O-ring 37. The space enclosed by membrane 34 forms a second chamber.

Plug element 16 now functions as follows. When entering plug receiver 13 as described above, the protruding parts 23' of legs 23, which are made of a slightly elastic material, are pressed inward by receiver 13 and so the legs are pressed against the tubular bag 29. This pressure forces the liquid inside bag 29 to seep slowly either through the not leakproof closure of check valve 32 or alternatively through a perforation in cover 31 or valve 32 into the second chamber enclosed by membrane 34, causing a gradual expansion of the latter.

In the course of this process, the legs 23 will be bent inwards to such a position that they cannot prevent plug element 16 from leaving plug receiver 13 any longer. Consequently, plug element 16 will be pushed through and out of plug receiver 13 by the pressure of the fluid in the upstream section of the conduit and as already explained above this will allow valve member 9 to return to its initial position and close outlet port 7.

As soon as plug element 16 has left plug receiver 13, the legs 23 will elastically return to their original position and bag 29 and membrane 34 will elastically resume their original shape. Because of this the liquid which has been squeezed out of bag 29 will flow back into it via the now open check valve 32. As the check valve 32 is open now the return of the liquid will be completed in a very short time and plug element 16 will be ready for service again when it arrives at the next distribution valve.

The period during which the plug element 16 is held in the plug receiver 13 depends on the time needed for pressing a certain amount of liquid out of the first chamber, comprising tubular bag 29, and into the second chamber closed by membrane 34. This time again depends on the pressure difference between tubular bag 29 and the membrane closed second chamber. This pressure difference can be adjusted by means of a piston 60 slidably mounted inside plug head 36, a sealing ring 61 being present between piston 60 and the inner wall of the head 36. The piston is connected with a threaded rod 62 running through a threaded bore in the front wall of the head 36. By moving the piston 60 in the one or the other direction the pressure of the air present in the space between the piston and the membrane can be changed so that the period will have the desired value. The adjusting rod 62 is locked by means of nut 63.

Figure 3:
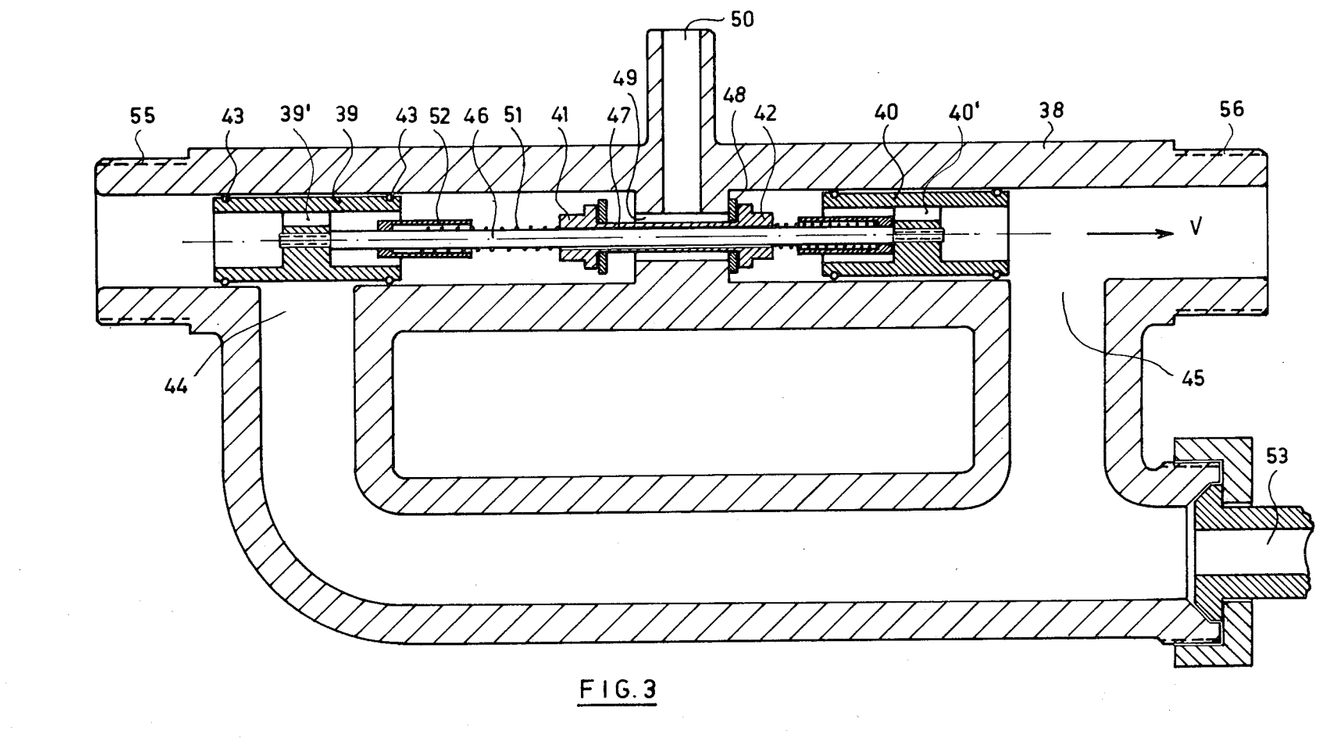
FIG. 3 is a cross-section diagram of a flow control valve in accordance with the present invention.

Having activated and passed through all the distribution valves in a pipeline, plug element 16 arrives at a flow control device as illustrated in FIG. 3. This device consists of a cylindrical housing 38 within which there are two fluid control valves 39 and 40 and two vent control valves 41 and 42. The fluid control valves 39 and 40, which are of sliding plunger type and provided with sealing rings 43, serve to cover or uncover supply inlet ports 44 and 45 in casing 38. The valves 39 and 40 are provided with at least one hole 39' and 40', respectively, so that fluid can pass through to the vent control valves. To ensure the synchronous displacement of the valves 39 and 40 there is provided valve interconnecting means comprising rod 46. The vent control valves 41 and 42 are connected with each other by means of a tubular sleeve 47, slidably mounted on a connecting rod 46. The sealing surfaces of vent control valves 41 and 42, formed by sealing rings 48, co-operate with a bore 49 surrounding the sleeve 47 and connected to vent 50. Vent control valves 41 and 42 are interconnected to fluid control valves 39 and 40 by springs 51 and distance tubes 52, mounted on connecting rod 46 between each pair of fluid control and vent control valves.

Figure 4:
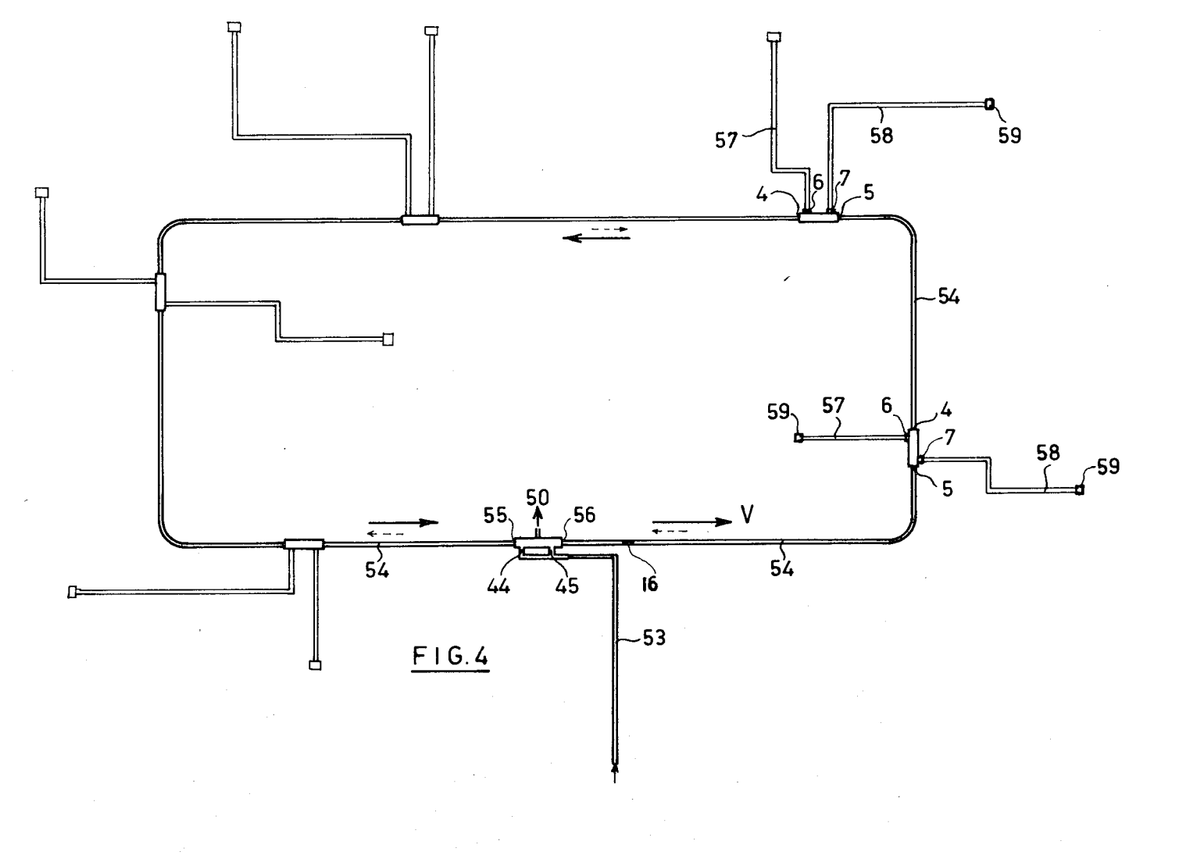
FIG. 4 is a diagram of a fluid distribution system in accordance with the present invention.

In the situation illustrated in FIGS. 3 and 4, the fluid supplied by the main supply line 53 enters through the open supply inlet port 45 and flows through the threaded connection 56 into the pipeline 54 in the direction indicated by arrow V. Pipeline 54 comprises a number of distribution valves, shown in FIG. 1, and its other terminal end is connected to the opposite threaded connection 55 of casing 38 near supply inlet port 44.

When a plug element 16, shown in FIG. 2, is carried along with the fluid flowing through pipeline 54 and received by a distribution valve, it will open one of its lateral outlet ports in the manner described before. After a certain period, plug element 16 will leave this distribution valve and move on to the next one in the series. During this displacement any quantity of fluid present in the pipeline downstream of the plug element is carried in front of it and disposed of through the open vent control valve 41.

Having passed through all the distribution valves in the pipeline, plug element 16 engages flow control valve 39 and thereby blocks up the passage 39'. Consequently, the full pressure of the fluid is exerted on the combination of plug element 16 and valve 39 and plug element 16 and supply inlet valve 39 will be moved to the right as viewed in FIG. 3, by which movement supply inlet port 44 is opened and supply inlet port 45 closed.

Having moved somewhat to the right valve 39 will start putting an increasing load on spring 51, which will transfer this load to exhaust valve 41, but valve 41 will remain open for the time being due to the opposing pressure of the fluid on the closed exhaust valve 42. As soon, however, as supply inlet port 45 has been fully closed valve 39 will push distance tube 52 against valve 41. The greater force of the fluid on the blocked-up valve 39 will now overcome the lesser opposing force of the fluid on the smaller closed valve 42, with the result that valve 42 is forced off its seat and valve 41 immediately pressed on to its seat by the compressed spring 51. From now on fluid control valve 39 and vent control valve 42 are open so that the fluid supplied by the main supply line 53 enters through supply inlet port 44 and flows through pipeline 54 in the opposite direction. Plug element 16 will again successively pass through the distribution valves in pipeline 54, this time entering via their through-ports 4 and opening their lateral outlet ports 6.

In the foregoing, reference has already been made to FIG. 4, showing the lay-out of an distribution system in which the various described components are used. As explained in connection with FIG. 3 the fluid is fed by main supply line 53 to the flow control device with supply inlet ports 44 and 45 and the connections 55 and 56, respectively. With the control device positioned as shown in FIG. 3, the flow in conduit 54 is to the right, as indicated by arrow V. In FIG. 4 of the drawing, five distribution valves are connected with their through-ports 4 and 5 to the conduit 54. Lateral lines 57 and 58 connect the outlet ports 6 and 7 of the distribution valves to distribution devices, e.g., sprinklers 59, shown in FIGS. 5–7.

In the situation represented in FIG. 4, the plug element starting from the flow control device will first arrive at the distribution valve situated on the extreme right and fluid will be supplied to the first lateral line 58. After a certain period this flow is interrupted and the fluid will then be supplied to lateral line 58 of the next distribution valve, and so on. When the fluid has been supplied to all lateral lines 58 during a given period, plug element 16 will arrive at fluid control valve 39 of the flow control device as shown in FIG. 3, and will act on the valve to cause a reversal in the direction of fluid flow through conduit 54. Fluid will then be supplied to lateral line 57 of the distribution valve immediately to the left of the flow control device, and subsequently to lateral line 57 of the next distribution valve, and so on.

Figure 5:
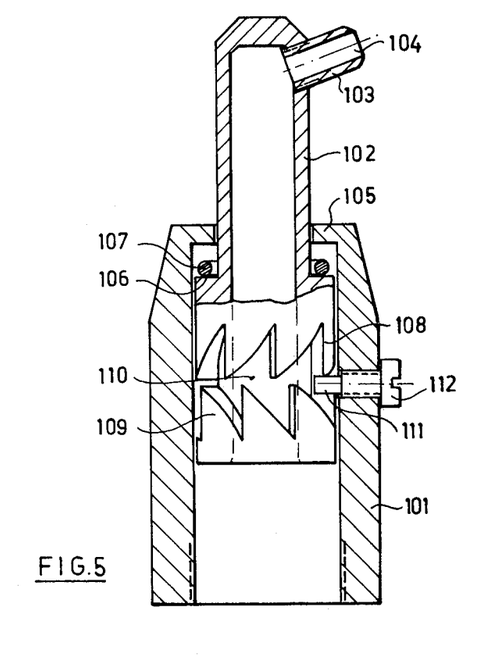
FIG. 5 is a cross-section view of a sprinkler head useable in the fluid distribution system of FIG. 4.

The sprinkler illustrated in FIG. 5 comprises an upright stand pipe 101, a sprinkler head 102 slidably mounted on it, and a nozzle 103 with orifice 104, screwed in sprinkler head 102 at an inclined angle. Stand pipe 101 is provided with an inside collar 105 which co-operates with a flange 106 on sprinkler head 102. A sealing ring, e.g. a rubber O-ring 107 has been fitted between collar 105 and flange 106. The lower part of sprinkler head 102 is provided with toothed crowns 108 and 109, separated by a recess 110, into which projects a pin 111 as part of a screw 112, which is tightly fitted in the wall of stand pipe 101.

Figure 6:
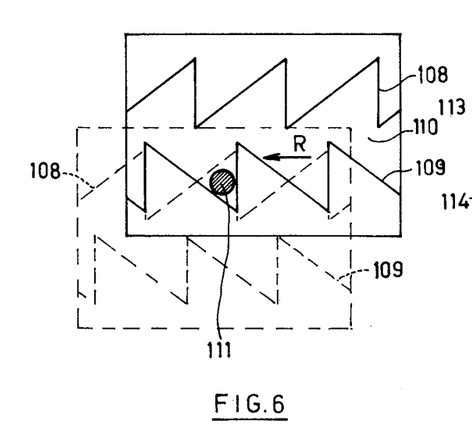
FIG. 6 is a drawing illustrating the operation of the indexing means of the sprinkler head shown in FIG. 5.

Water fed under pressure to stand pipe 101 will raise sprinkler head 102 until sealing ring 107 is pressed firmly between collar 105 and flange 106. In this position, pin 111 rests between adjacent teeth in the lower crown 109, as indicated in FIG. 6. When the supply is cut off, the pressure drops and sprinkler head 102 will return to its lower end position. During this downward movement, a sloping flank of one of the teeth in the upper crown 108 will hit against pin 111 and cause sprinkler head 102 to turn in the direction indicated by arrow R until pin 111 rests between two adjacent teeth in crown 108 and sprinkler head 102 can not move downward further. When the water supply is re-established sprinkler head 102 will be pushed upward and the sloping flank of the next tooth in the lower crown 109 will hit against pin 111, forcing the sprinkler head to slightly turn again in the direction of arrow R in FIG. 6. During the now following sprinkling period pin 111 will rest between the next pair of adjacent teeth in lower crown 109 and nozzle 103 will consequently point in an other direction than before. In this manner, a different sector of the area surrounding stand pipe 101 will be irrigated during each successive sprinkling period.

Figure 7:
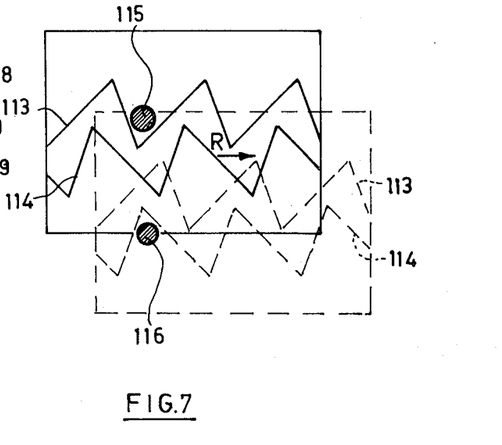
FIG. 7 is an illustration of the operation of a alternate indexing means useable with the sprinkler head of FIG. 5.

In the embodiment shown in FIG. 7 rows of teeth 113 and 114 are cut in a raised cam around the periphery of sprinkler head 102 and co-operate with two pins 115 and 116, screwed or otherwise fastened into the wall of stand pipe 101. In the drawing, full lines show the locations of pins 115 and 116 when sprinkler head 102 is in its higher end position during sprinkling, and dotted lines show the position of the sprinkler head relative to the pins 115 and 116 when the water supply has been cut off and sprinkler head 102 has returned to its lower end position. Evidently, the co-operation of teeth rows and pins has the same effect in both embodiments. However, the arrangement shown in FIG. 7 may have certain advantages from a manufacturing point of view.

While there have been described what are believed to be the preferred embodiments of the present invention, those skilled in the art will recognize that other and further modifications may be had thereto without departing from the true spirit and scope of the invention, and it is intended to cover all such embodiments which fall within the true scope of the invention.

I claim:

1. A system for distributing a fluid supplied under pressure comprising:
   a. a conduit for conducting said fluid;
   b. a plug element within said conduit and moveable therethrough;
   c. a plurality of valves arranged along said conduit, each of said valves having an outlet and a valve closing means which may be selectively opened and closed for distributing said fluid through said outlet, said valve closing means including a plug receiving member;
   d. engagement means for selectively engaging and disengaging said plug and said plug receiving member, said plug receiving member being arranged to open said valve closing means when engaged with said plug element and being arranged to permit said plug element to move from one valve to the next when disengaged; and
   e. means for selectively controlling the engaging and disengaging of said engagement means;
   whereby said system distributes said fluid by sequentially opening and closing said valves as said plug element moves through said conduit and into engagement and disengagement with the valve closing means in each of said plurality of valves.

2. A system as specified in claim 1 wherein said conduit has first and second conduit ends, and wherein there is provided flow control means for selectively connecting a fluid source to said first and second conduit ends to cause said fluid to flow through said conduit in alternate first and second directions.

3. A system as specified in claim 2 wherein said flow control means includes activating means for engaging said plug element, said activating means being arranged to cause said fluid pressure to operate said flow control means when said plug element is engaged, thereby reversing said direction of fluid flow.

4. A system as specified in claim 2 wherein said plug means engages and activates each of said valve closing means in response to fluid pressure in either of said alternate directions.

5. A system as specified in claim 4 wherein each of said valves has a plurality of outlets, and wherein said valve closing means is arranged to open at least a first outlet in response to fluid pressure in said first direction and open at least a second outlet in response to fluid pressure in said second direction when said plug element is engaged in said plug receiving member.

6. A system as specified in claim 1 wherein
each of said valves (C) comprises a tubular housing arranged in said conduit for fluid flow along the axis of said housing, and the outlet comprises an opening through the wall of said housing,
each valve has a valve member within said housing for closing said outlet, which is in a normally closed position and displaceable to an open position,
said valve member being linked to a tubular sleeve for receiving said plug element, and
wherein said plug element (b) comprises a cylindrical body,
said engagement (d) means on said plug element comprises radially displaceable members protruding from said body for engaging said sleeve and
said means (e) for controlling said engagement means comprises a first elastic fluid filled chamber, within the body of said plug element which maintains said engagement (d) means, in an extended position, a second chamber connected to said first chamber by a narrow passage, and a check valve for allowing fluid to flow from said second to said first chamber,
whereby when said plug element enters the sleeve of said valve member said engagement means hold said plug element in said sleeve until a selected amount of fluid flows from said first chamber to said second chamber through said narrow passage thereby releasing said engaging means and permitting said plug element to pass through and leave said sleeve, and when said plug element leaves said sleeve said fluid returns to said first chamber through said check valve,
and while said plug element is held in the sleeve of said valve fluid pressure acting on said plug element displaces said sleeve and said valve member linked thereto in said housing and permits fluid flow through said outlet, and when said plug element leaves said sleeve said valve member returns to its closed position and fluid flows through said housing and said sleeve.

7. A plug element, usable in a fluid distribution system having a plurality of valves arranged along a conduit, for engaging valve closing means on said valves for a selected period and acting on said valve closing means in response to fluid pressure to open said valve closing means and allow said fluid to flow through outlets on said valves, comprising:
a substantially cylindrical body;
radially displaceable means, protruding from said body, for engaging said valve closing means;
and means for holding said engaging means in a protruding position for a selected time after said engaging means engage said valve.

8. A plug element as specified in claim 7 wherein said valve closing means apply radial forces to said engaging means and said engaging means applies forces to activate said holding means.

9. A plug element as specified in claim 8 wherein said holding means comprises:
a first fluid filled chamber in force transmitting contact with said engaging means;
a second chamber connected to said first chamber by a narrow passage;
and a check valve for allowing fluid to flow from said second to said first chamber.

10. A plug element as specified in claim 9 wherein said second chamber is enclosed in an air filled housing.

11. A plug element as specified in claim 10 wherein there is provided means for adjusting the pressure of said air in said housing.

12. A plug element as specified in claim 11 wherein said pressure adjusting means comprises a piston within said housing moveable by a rod extending outside said housing.

13. A valve, usable in a fluid distribution system, wherein a plug element engages valves arranged along a conduit for a selected period and acts on said valves in response to fluid pressure, comprising:
a housing having first and second through ports arranged for connection to said conduit;
at least one fluid outlet on said housing;
a tubular sleeve, displaceably mounted in said housing, between said ports and having a reduced passage with respect to said conduit to receive and engage said plug;
and valve closing means, responsive to displacement of said sleeve, by an engaged plug for opening and closing said outlet.

14. A valve as specified in claim 13 wherein said housing comprises a tubular passage for fluid flow along the axis thereof, said outlet comprises an opening in the wall of said housing and wherein said sleeve is arranged coaxially within said housing.

15. A valve as specified in claim 13 wherein there are provided at least two of said outlets, and wherein said valve closing means comprises a first valve member, responsive to displacement of said sleeve in a first direction, for opening a first outlet and a second valve member, responsive to displacement of said sleeve in a second direction, for opening a second outlet.

16. A valve as specified in claim 13 wherein said sleeve has frustro-conical widened entrances.

17. A flow control device, usable in a fluid distribution system wherein a plug element engages said control device and activates said control device to reverse the direction of fluid flow in said distribution system, comprising:
a housing having a fluid inlet and first and second fluid outlets;

first and second fluid control valves for controlling fluid flow from said inlet through said first and second fluid outlets;

first and second vent control valves, for venting said first and second outlets to air;

and means, responsive to said plug element, interconnecting said fluid control valves and said vent control valves, so that when said first fluid control valve is open said second vent control valve is open, said first vent control valve is closed and said second fluid control valve is closed, and when said second fluid control valve is open, said first vent control valve is open, said second vent control valve is closed and said first fluid control valve is closed.

18. A flow control device as specified in claim 17 wherein said first and second fluid control valves are axially aligned and displaceable in said housing, and wherein said interconnecting means comprises a connecting rod between said fluid control valves, and wherein said vent control valves are between said fluid control valves and connected to each other by a sleeve slidably mounted on said connecting rod and wherein there is provided a spring on said connecting rod between each of said fluid control valves and the adjacent vent control valve.

19. A flow control device as specified in claim 18 wherein each of said flow control valves has an inside passage and wherein said passage may be blocked by said plug element.

* * * * *